UNITED STATES PATENT OFFICE.

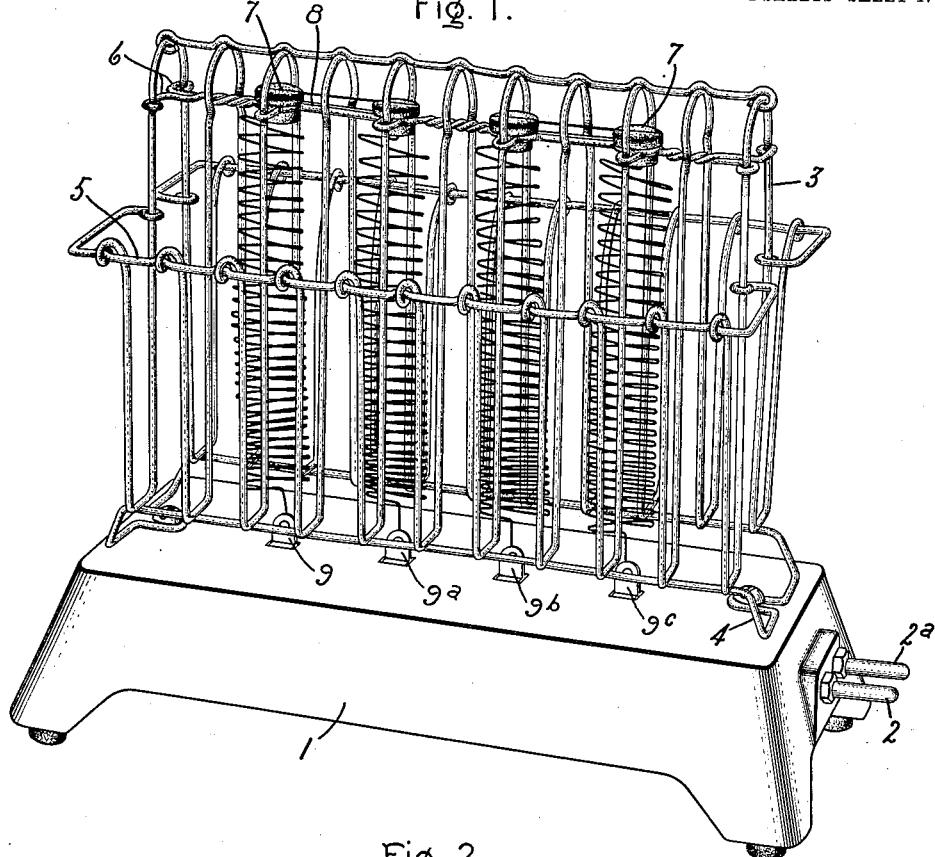
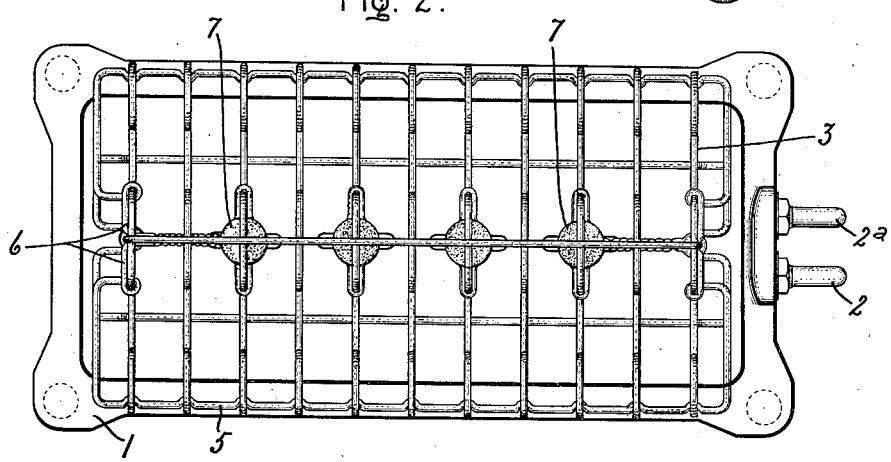

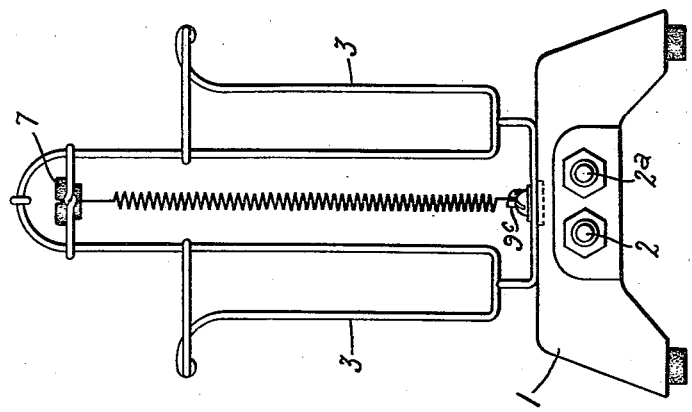
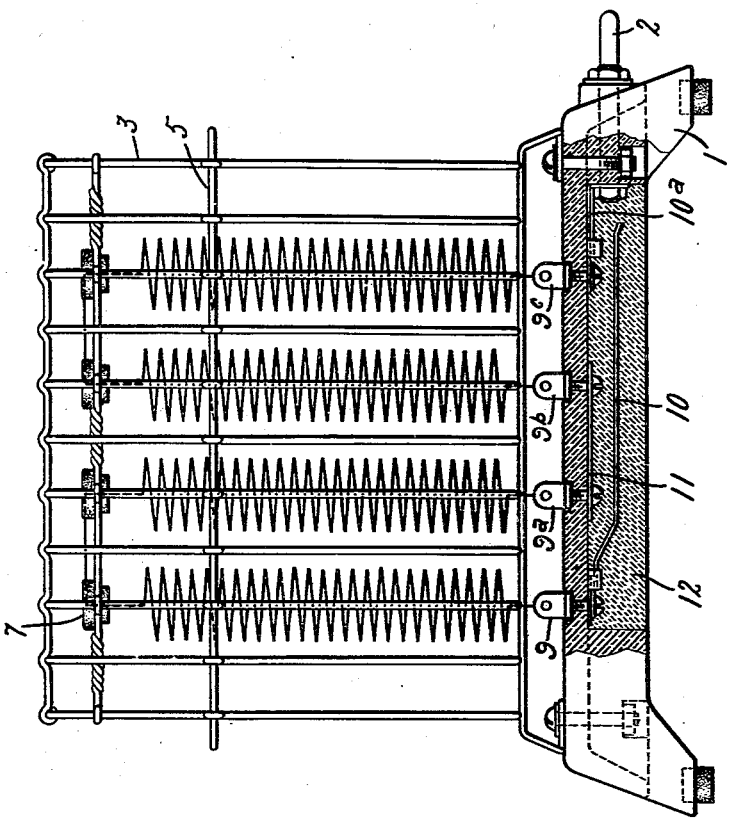

LEON F. PARKHURST, OF PITTSFIELD, MASSACHUSETTS, ASSIGNOR TO GENERAL ELECTRIC COMPANY, A CORPORATION OF NEW YORK.

ELECTRIC TOASTER.

951,287.  Specification of Letters Patent.  Patented Mar. 8, 1910.

Application filed November 20, 1908. Serial No. 463,620.

*To all whom it may concern:*

Be it known that I, LEON F. PARKHURST, a citizen of the United States, residing at Pittsfield, in the county of Berkshire, State of Massachusetts, have invented certain new and useful Improvements in Electric Toasters, of which the following is a specification.

This invention relates to an electric cooking device of the kind in which it is necessary to apply radiant heat to secure the best results. In certain cooking processes the product is most palatable and healthful when effected entirely by radiant heat, such, for example, as that of making toast, which in ordinary practice is best effected by placing bread in front of a very hot open fire, so that the surface of the bread is quickly crisped and browned before the interior or body is thoroughly robbed of its moisture. Similarly, in broiling meats the best result is secured by a purely radiant heat, which sears the outside and keeps the juices within the body of the meat.

My present invention is particularly adapted to toasting, though broiling might be equally well conducted on a device having the same design, being modified only in details to provide for the collection of such juices as are roasted from the meat.

In carrying out my invention I provide a source of radiant heat, consisting of a resistance wire which may be run at a red heat without damage, and mounted vertically in the frame so that a considerable area of hot wire is provided sufficient to cover the material operated upon, as, for example, pieces of bread to be toasted. I mount this wire in a skeleton frame or cage mounted upon an insulating support, in which terminals are provided for leading current to the resistance wire. On the two sides of the resistance wire are provided baskets forming part of the cage inclosing the wire, in which two pieces of bread may be slipped for exposure to the radiant heat of the wire. I thus provide that both sides of the hot surface may be rendered effective and permit two pieces of bread to be toasted, each on a single side at the same time. After being thus toasted the bread is reversed in the baskets, so as to complete the operation. In the top of the framework I provide a plurality of insulators, in which the wire is supported. The open cage not only provides means for supporting the bread; but prevents contact of the highly heated wire with clothing of the operator, or with any combustible material. It also protects the wire itself from damage by blows or accidents, and also rapidly promotes ventilation, giving free access to the air in a body of small heat storage capacity, and, therefore, permits the device to run cool, a very desirable feature from the standpoint of the operator. Moreover the circulation of air about the open cage permits the device to be handled without serious inconvenience or delay, as the top runs very cool, and the utensil may be handled by the operator immediately on conclusion of its period of service.

My invention is an improvement on the type of toaster described in a patent of W. S. Andrews, No. 936,597. In that device the source of radiant heat is inclosed in a series of tubes made of fused silica. The several units have both resistance terminals at one end in a socket.

In my improvement I use a similar open work cage or support with a basket at each side of the heating unit, but the cage is of different construction, and I dispense with the expensive quartz tube and render the heating wire self-sustaining by top insulating supports.

The accompanying drawings illustrate the invention.

Figure 1 is a perspective view of a heating device embodying my improvements, designed particularly with reference to the operation of toasting bread; Fig. 2 is a plan view; Fig. 3 is a side elevation partly in section; Fig. 4 is an end elevation.

1 represents a base formed of porcelain, slate, or other suitable insulating material, upon which are mounted two terminals, 2—2ª, adapted to receive a connecting plug leading from the source of current supply. Upon this base is mounted the open wirework frame or cage 3. This frame or cage is formed of stout wire of sufficient section, say 1/16 of an inch, to provide a rigid support for the parts and to prevent injury in ordinary service. The cage is formed of a number of parallel fleur-de-lis or W-shaped pieces of wire, as indicated in the drawings, bound together at the top and bottom by transverse wires and preferably united by hard solder to form a rigid structure. The bottom frame wires are bent as indicated at 4, and provided with an eye to engage bolts or screws to secure it to the base. The outer limbs of the W-shaped pieces are connected by a wire frame 5, the ends of which are bent around the stem of the W, and a solid joint with the said outer limbs is made by forming a kink or indentation in the frame and closely curling the wire in the indentation, thus forming with the outer limbs of the W a basket in which the bread may be placed. Near the top of the cage is provided a double wire 6 provided with a plurality of circular openings to receive the insulators which support the top of the resistance wire. On each side of each circular opening is left an untwisted part of this double wire, to permit the convenient assembly of the wire and insulators. The insulators are shown at 7 and the untwisted portions at 8. The two ends of this support are bent about a kink formed in the end wires of the cage, as indicated in the perspective view, Fig. 1.

The resistance wire may be of any approved material; but should be a material which will withstand a bright red heat for a long period without disintegration or change of resistance from oxidation. For this purpose may be used the resistance wire covered by the patent of Dempster, No. 901,428, dated October 20, 1908, made of a chromium alloy, giving a high specific resistance and being proof against disintegration from repeated and long service at high heat. This wire by preliminary heating forms on its surface a very thin film of tough oxid, which is a sufficiently good insulator to prevent short circuit between turns, even if adjacent turns are brought into contact. Wire of any proper section, flat or round, of this material is coiled, reflexed, or otherwise formed in two connected lengths into a flat helix, as indicated in the drawings; but the section should be sufficiently large to make the coils self-sustaining, and to admit of this I connect the coils in series, the free ends being fastened in metallic posts 9—9ª, etc., secured by screws to the base. The upper connected end, in the form of an inverted U, is slipped through the slot in the supporting wire. The insulators are pushed around the wire by means of lateral slots indicated in Figs. 1 and 3. These insulators are provided with a slot across the top and another slot vertically through the head, so that the wire may be firmly seated before the insulator is pressed into its socket in the wire support. The double wire support may be sprung open to receive the insulator, and when retracted will lock it in place. There are shown in the drawings two pairs of such wire helices supported by four insulators. The two outer posts 9—9ᶜ are connected by leads 10—10ª with the terminals 2—2ª. The intermediate posts 9ª—9ᵇ are connected together by a conducting strip 11. It will thus be seen that the wire coils or heating sections are connected in series with each other, and this is important, as it enables me to employ wire of larger cross section and prevents sagging of the coils or reflexes and makes the device hardier. A slot is formed in the bottom of the insulating support to admit insertion of these connecting leads and strips, which is afterward sealed with an insulating cement, as indicated at 12. There is thus provided a rigid openwork frame adapted to support two pieces of bread, and a naked heating unit adapted to be run at red heat, which may radiate heat upon the confronting faces of the bread and toast the same, two pieces being toasted at the same time. Moreover, the frame being formed of metal having a small mass, has but little heat storage, and the apparatus is in operation at its maximum efficiency almost instantly when the circuit connections are made. The framework having so little mass has very small heat storage and relatively large radiating surface and runs cool; the operation of toasting may be observed at every stage, and the slices of bread may be easily reversed at the instant the proper degree of toasting is attained. The columns of hot wire induce an upward current of air, which not only keeps the framework relatively cool, but removes any smoke or products of decomposition of the toasting operation, and prevents its absorption by the bread, conducing to a better product. This ascending column of air also keeps the upper part of the toasting cage or rack cool, and permits it to be handled even while the apparatus is in operation.

While I have described the invention with particular relation to its application to toasting, it will be evident to those skilled in the art that it is well adapted also to other operations in which a radiant heat is essential to a good culinary product, such as broiling, and although I have described with particularity the application of the invention to toasters, I do not desire to be limited to this particular use, but reserve for my own use any application of the invention within the terms of the claims.

What I claim as new and desire to secure by Letters Patent of the United States, is—

1. An electric cooking utensil, comprising a plurality of high resistance refractory bodies of bare wire adapted to operate at a red heat, supported in an inclosing metal cage provided with baskets at the sides, and a plurality of insulators in the upper part of the cage to support the resistance bodies, whereby radiant heat may be applied at both sides of the heating element to material placed in the baskets.

2. An electric cooking utensil, comprising a plurality of coils of high resistance refractory wire having a film insulation and adapted to be run continuously at a red heat, a metal cage inclosing the coils having baskets at the sides, and a plurality of insulators in the upper part of the cage to support the coils, whereby radiant heat may be applied at both sides of the heating element to material placed in the baskets.

3. An electric cooking utensil, comprising a plurality of coils of bare high resistance refractory wire of an alloy containing chromium, adapted to be run continuously at red heat, a metal cage inclosing the coils having baskets at the sides, and a plurality of insulators in the upper part of the cage to support the coils, the several coils being in series, whereby the radiant heat of the wire may be directly applied at both sides of the coils upon material placed in the baskets.

4. An electric cooking utensil, comprising an openwork wire cage having baskets at the sides to receive material to be toasted or broiled, a high resistance refractory heating wire mounted between the baskets, terminals and leads in the base, and a plurality of insulating plugs at the top to support the wire.

5. An electric cooking utensil, comprising an openwork wire cage having baskets at the sides to receive material to be toasted or broiled, a plurality of coils of bare high resistance wire mounted between the baskets, the lower coil ends being connected at the base with leads and terminals, and the upper ends supported in removable plugs of fireproof insulating material.

6. An electric cooking utensil, comprising an openwork wire cage having baskets at the sides to receive material to be toasted or broiled, a plurality of coils arranged in series of bare high resistance wire of an alloy containing chromium mounted between the baskets and connected at the base with leads and terminals, and a plurality of removable insulators supporting the upper ends of the coils.

7. An electric cooking utensil, comprising an openwork wire cage having baskets at the sides to receive material to be toasted or broiled, a plurality of coils of bare high resistance wire of an alloy containing chromium, arranged in series and mounted between the baskets, the lower coil ends connected with leads and terminals in the base, and a plurality of slotted removable insulator plugs near the top of the cage to support the coils and permit assembly and removal.

8. An electric cooking utensil comprising a high resistance refractory body of bare wire adapted to operate at red heat supported in an inclosing metal cage provided with baskets at the sides, and an insulator in the upper part of the cage to support the resistance body, whereby radiant heat may be applied at both sides of the heating element to the material placed in the basket.

9. An electric cooking utensil comprising a coil of high resistance refractory wire having a film insulation and adapted to run continuously at a red heat, a metal cage inclosing the coils having baskets at the sides, and an insulator on the upper part of the cage to support the coil, whereby radiant heat may be applied at both sides of the heating element to the material placed in the basket.

In witness whereof, I have hereunto set my hand this eighteenth day of November, 1908.

LEON F. PARKHURST.

Witnesses:
CHARLES BURGGAW,
JAMES I. CARROLL.